United States Patent
Park et al.

(10) Patent No.: US 10,732,768 B2
(45) Date of Patent: Aug. 4, 2020

(54) PANEL DRIVING APPARATUS AND PANEL DRIVING SYSTEM INCLUDING RESET FUNCTION

(71) Applicant: SILICON WORKS CO., LTD., Daejeon (KR)

(72) Inventors: Jong Min Park, Sejong-si (KR); Ha Na Choi, Daejeon (KR)

(73) Assignee: SILICON WORKS CO., LTD., Daejeon (KR)

(*) Notice: Subject to any disclaimer, the term of this patent is extended or adjusted under 35 U.S.C. 154(b) by 288 days.

(21) Appl. No.: 15/874,688

(22) Filed: Jan. 18, 2018

(65) Prior Publication Data
US 2018/0210608 A1    Jul. 26, 2018

(30) Foreign Application Priority Data

Jan. 20, 2017 (KR) .................. 10-2017-0009933

(51) Int. Cl.
*G06F 3/041* (2006.01)
*G09G 3/36* (2006.01)
*G06F 3/044* (2006.01)

(52) U.S. Cl.
CPC ......... *G06F 3/0418* (2013.01); *G09G 3/3688* (2013.01); *G06F 3/044* (2013.01); *G09G 2310/08* (2013.01); *G09G 2330/08* (2013.01); *G09G 2330/12* (2013.01); *G09G 2354/00* (2013.01)

(58) Field of Classification Search
CPC .. G06F 3/0418; G06F 3/04184; G06F 3/0412; G09G 2330/08; G09G 2330/12
See application file for complete search history.

(56) References Cited

U.S. PATENT DOCUMENTS

2018/0188868 A1* 7/2018 Park .................. G06F 3/0412
2019/0079636 A1* 3/2019 Lee .................. G06F 3/04184

FOREIGN PATENT DOCUMENTS

KR    10-2015-0028030 A    3/2015
KR    10-2016-0037307 A    4/2016

OTHER PUBLICATIONS

Machine translation of KR 10-2016-0037307 (Year: 2019).*

* cited by examiner

*Primary Examiner* — Michael Pervan
(74) *Attorney, Agent, or Firm* — Fenwick & West LLP (57) ABSTRACT

The present disclosure relates to a panel driving apparatus, in which a touch driving circuit determines whether there is a fault therein, using frame signals received to a data driving circuit, and when it is determined that there is a fault in the touch driving circuit on the basis of a fault signal, a touch data processing apparatus automatically recovers the touch driving circuit by outputting a reset signal.

17 Claims, 6 Drawing Sheets

PANEL DRIVING APPARATUS AND PANEL DRIVING SYSTEM INCLUDING RESET FUNCTION

CROSS REFERENCE TO RELATED APPLICATION

This application claims priority from Republic of Korea Patent Application No. 10-2017-0009933, filed on Jan. 20, 2017, which is hereby incorporated by reference for all purposes as if fully set forth herein.

BACKGROUND

1. Field of the Invention

The present embodiment relates to a technology of driving a panel.

2. Description of the Prior Art

A display device may include a panel having a plurality of pixels defined thereon and devices that drive the panel.

A panel driving apparatus, for example, may include a gate driving apparatus that supplies scan signals to gate lines connected to pixels. Further, the panel driving apparatus, for example, may include a data driving circuit that supplies data voltages to data lines connected to the pixels. Further, the panel driving apparatus, for example, may include a common voltage electrode circuit that supplies common voltages to common voltage electrodes (CE) on a panel. Further, the panel driving apparatus, for example, may include a touch driving circuit that supplies touch driving signals to touch electrodes on the panel.

Such a panel driving apparatus may be implemented in an integrated circuit (IC). For example, the gate driving apparatus may be implemented as a gate driving apparatus integrated circuit and the data driving circuit may be implemented as a data driver integrated circuit. Further, for example, the touch driving circuit may be implemented as a touch driver integrated circuit.

The devices, for example, the gate driving apparatus, the data driving circuit, and the touch driving circuit, may be separately implemented as integrated circuits, but may be combined in one integrated circuit. For example, the data driving circuit and the touch driving circuit may be implemented into one combined integrated circuit. A combined integrated circuit, which has been known as a source readout integrated circuit (SRIC), is an integrated circuit obtained by partially combining a data driving circuit and the touch driving circuit.

Meanwhile, such a panel driving apparatus may abnormally operate due to internal problems. For example, when a problem occurs in the internal circuit while the panel driving apparatus sequentially drives a plurality of touch electrodes, a touch may not be sensed through some of the touch electrodes and errors may occur in touch coordinates.

Such problems in the internal circuit may be caused by external shock that causes irreversible damage such as overvoltage or overcurrent, but in most cases, the problems may be temporal phenomena that are caused by temporal inflow of noise or a temporal tangle in internal logic.

A technology of automatically recovering from these temporal problems was not applied to display devices in the related art, so even if a temporal problem occurred in a panel driving apparatus, it was considered that the entire display device broke down. Further, a technology of immediately finding out these temporal problems was not applied to display devices in the related art, so the display devices were operated without a fault removed for a long time of time or it was difficult to repair the display devices.

SUMMARY

Under this background, an aspect of the present embodiment is to provide a technology of enabling a panel driving apparatus to determine whether there is a fault of an internal circuit. Another aspect of the present embodiment is to provide a technology of automatically recovering a panel driving apparatus having a temporal problem by resetting the panel driving apparatus.

An embodiment provides a panel driving apparatus including: a data driving circuit configured to discriminate frame times on the basis of received frame signals and supply data voltages corresponding to image data to pixels; and a touch driving circuit configured to count touch driving signals supplied to a plurality of touch electrodes and determine that there is a fault when there is a difference between a set value and the count value of the touch driving signals at a point in each of the frame times identified by the frame signals.

Another embodiment provides a panel driving system including: a plurality of panel driving integrated circuits configured to discriminate frame times on the basis of received frame signals, supply data voltages corresponding to image data to pixels, determine whether there is a fault in a touch driving circuit at a point in each of the frame times, and output a fault signal when determining that there is a fault in the touch driving circuit; and a touch data processing apparatus configured to output a reset signal to a specific panel driving integrated circuit that outputs the fault signal.

According to the embodiments described above, it is possible to easily find out a fault in a panel driving apparatus. Further, according to the embodiments, it is possible to reset a panel driving apparatus having a fault and automatically recover the panel driving apparatus from the fault.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
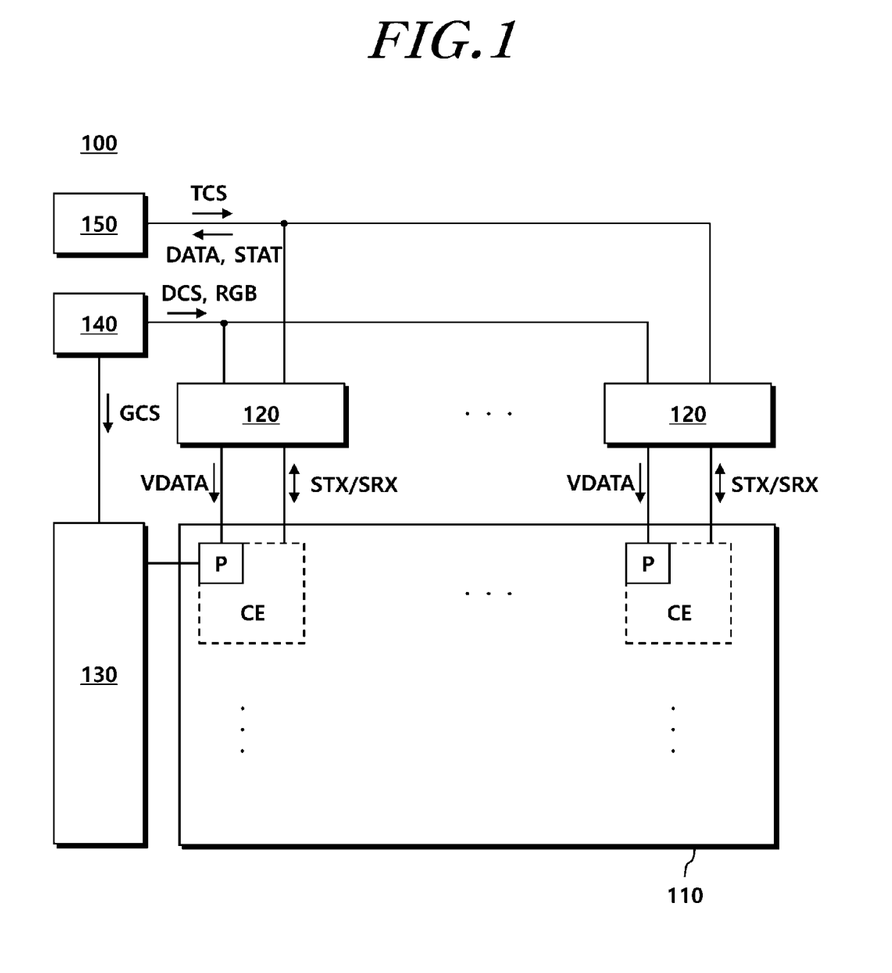
FIG. 1 is a diagram showing the configuration of a display device according to an embodiment.

FIG. 1 is a diagram showing the configuration of a display device according to an embodiment.

Referring to FIG. 1, a display device 100 may include a panel 110, a panel driving apparatus 120, a gate driving apparatus 130, a timing control apparatus 140, and a touch data processing apparatus 150.

In the panel 110, only a display panel may be included or a touch panel (TSP: touch screen panel) may be further included. The display panel and the touch panel may share some components. For example, touch electrodes for sensing a touch on the touch panel may be common voltage electrodes CE to which common voltages are supplied on the display panel. Since some of the components of the display panel and the touch panel are shared, the panel 110 is also called an integrated panel, but the present disclosure is not limited thereto. Further, an in-cell type panel in which a display panel and a touch panel share some components has been known, but this is only an embodiment of the panel 110 and panels to which the present disclosure is applied are not limited to such an in-cell type panel.

The panel driving apparatus 120 may include a data driving circuit and a touch driving circuit. The data driving circuit and the touch driving circuit may be implemented in a combined integrated circuit. In the following description, it is assumed that the data driving circuit and the touch driving circuit are combined in an integrated circuit. The panel driving apparatus 120 implemented in an integrated circuit may be referred to as a panel driving integrated circuit.

The data driving circuit supplies data voltages VDATA to data lines to display a digital image on pixels P of the panel 110. The data driving circuit may receive image data RGB from the timing control apparatus 140 etc., and it may convert the image data RGB into data voltages VDATA and then supply the data voltages to the data lines. The data driving circuit may supply data voltages to the data lines through data voltage lines DVL.

The touch driving circuit may sense an external object touching or approaching the panel 110 by supplying touch driving signals STX to touch electrodes disposed in the panel 110 and receiving response signals SRX to the touch driving signals STX. The common voltage electrodes CE disposed in the panel 110 may function as the touch electrodes. In this embodiment, the touch driving circuit may sense an external object touching or approaching the panel 110 by supplying touch driving signals STX to the common voltage electrodes CE and receiving response signals SRX generated at the common voltage electrodes CE. The touch driving circuit may supply the touch driving signals STX to the touch electrodes through touch driving signal lines TSL.

One panel driving apparatus 120 may be included in the display device 100, but when there are many pixels P or common voltage electrodes CE, a plurality of panel driving apparatuses 120 may be included.

The gate driving apparatus 130 sequentially supplies scan signals to gate lines to turn on or off transistors in the pixels P.

The gate driving apparatus 130, depending on the driving type, may be disposed at only one side of the panel 110, as in FIG. 1, or two separate gate driving apparatuses may be respectively disposed at both sides of the panel 110.

Further, the gate driving apparatus 130 may be implemented in at least one gate driver integrated circuit, which may be connected to a bonding pad of the panel 110 in a tape automated bonding (TAB) type or a chip on glass (COG) type or may be implemented in a gate in panel (GIP) type directly on the panel 110, or, in some cases, may be integrated in the panel 110. Further, the gate driving apparatus 130 may be implemented in a chip on film (COF) type.

The timing control apparatus 140 supplies various control signals to the panel driving apparatus 120, the gate driving apparatus 130, etc.

The timing control apparatus 140 may output a data control signal DCS for controlling the data driving circuit and a gate control signal GCS for controlling the gate driving apparatus 130 on the basis of vertical/horizontal synchronization signals Vsync and Hsync input from a host and external timing signals such as an image signal and a clock signal. Further, the timing control apparatus 140 may convert an image signal input from the host into a data signal form, which is used in the data driving circuit, and supply a converted image data RGB to the data driving circuit. For example, the timing control apparatus 140 may convert image data to fit to the resolution or pixel structure of the panel 110 and supply the converted image data RGB to the data driving circuit.

The data driving circuit may convert the converted image data RGB into an analog pixel signal, which is a voltage value corresponding to a gradation value, that is, data voltage VDATA, and supply the analog pixel signal to the data lines, in response to the data control signal DCS input from the timing control apparatus 140 and the converted image data RGB. The gate driving apparatus 130 may sequentially supply scan signals to the gate lines GL in response to the gate control signal GCS input from the timing control apparatus 140.

A frame signal (GSP: gate start pulse) indicating a frame time may be included in the data control signal DCS and the gate control signal GCS. The data driving circuit and the gate driving apparatus 130 may discriminate frame times on the basis of the frame signals.

The touch data processing apparatus 150 may sense an external object touching or approaching the panel 110 by receiving touch data DATA from the touch driving circuit.

The touch driving circuit may receive a response signal SRX to a touch driving signal STX and transmit touch data DATA created by processing the response signal SRX to the touch data processing apparatus 150. The touch data processing apparatus 150 may store touch data DATA respectively corresponding to the locations of the touch electrodes and create touch coordinates by comparing the touch data DATA with reference touch data, that is, touch data created for the touch electrodes when there is no touch. The touch data DATA may include values corresponding to capacitance of the touch electrodes. The capacitance of the touch electrodes may be changed when an external object touches or approaches the touch electrodes, and the touch data processing apparatus 150 may sense an object touching or approaching the panel 110 by recognizing a change in capacitance of the touch electrodes included in the touch data DATA.

The touch data processing apparatus 150 may further receive state information STAT from the touch driving circuit. Fault information showing whether there is a fault in the touch driving circuit may be further included in the state information STAT. The touch data processing apparatus 150 may examine the touch driving circuit with a fault on the basis of the fault information and recover the touch driving circuit from the fault by resetting the touch driving circuit.

The touch data processing apparatus 150 may transmit a touch control signal TCS for controlling the touch driving circuit and a reset signal may be included in the touch control signal TCS. The touch driving circuit may include a reset pin for resetting the internal circuit in response to an external signal. The reset pin of the touch driving circuit is connected to the touch data processing apparatus 150 in the display device according to an embodiment, and when the touch data processing apparatus 150 transmits a reset signal to the reset pin, the touch driving circuit may be reset.

Figure 2:
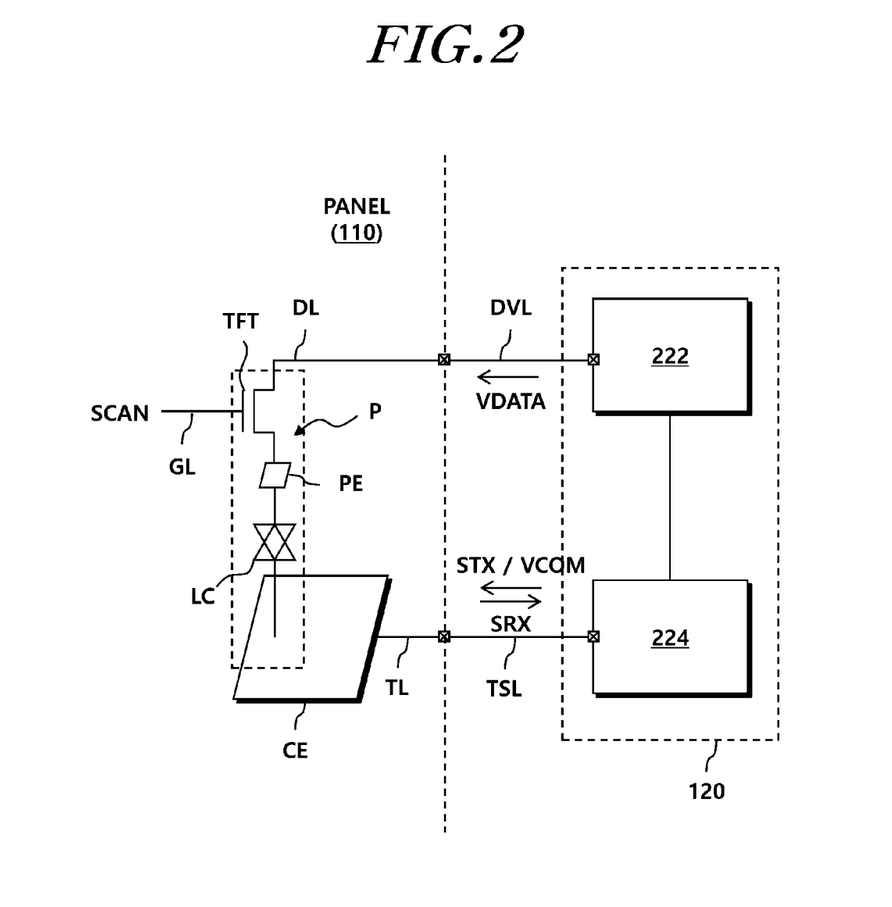
FIG. 2 is a diagram showing signals that are supplied to a pixel according to an embodiment.

FIG. 2 is a diagram showing signals that are supplied to a pixel according to an embodiment.

Referring to FIG. 2, a pixel P may include a transistor TFT, a pixel electrode PE, a liquid crystal LC, and a common voltage electrode CE.

In the transistor TFT, a gate terminal may be connected to a gate line GL, a drain terminal may be connected to a data line DL, and a source terminal may be connected to the pixel electrode PE toward the liquid crystal LC.

When a scan signal SCAN corresponding to turning-on voltage is supplied to the gate terminal through a gate line GL, current flows to the drain terminal and the source terminal of the transistor TFT and data voltage VDATA may be supplied toward the liquid crystal LC through the pixel electrode PE. The data driving circuit 222 of the panel driving apparatus 120 may supply the data voltage VDATA to the data line DL through the data voltage line DVL. The data voltage line DLV is a line electrically connecting the data driving circuit 222 and the data line DL.

Common voltage VCOM or a touch driving signal STX may be supplied to the common voltage electrode CE.

The touch driving circuit 224 may supply common voltage VCOM to the common voltage electrode CE in a display time and output a touch driving signal STX to the common voltage electrode CE in a touch driving time.

A touch line TL connected to the common voltage electrode CE may be disposed in the panel 110 and the touch driving signal line TSL may electrically connect the touch line TL and the common voltage electrode CE.

The gradation of the pixel P may be determined by the difference between the data voltage VDATA supplied to the pixel electrode PE and the common voltage VCOM supplied to the common voltage electrode CE in the display time. In general, the common voltages VCOM may be supplied at the same voltage level to all pixels and the gradation of the pixel P may be determined by adjusting the data voltage VDATA.

In the touch driving time, the common voltage electrode CE is used as a touch electrode and the touch driving circuit 224 senses an external object touching or approaching the panel 110 by checking a value corresponding to the capacitance or a capacitance variation of the common voltage electrode CE. In detail, the touch driving circuit 224 may supply a touch driving signal STX to the common voltage electrode CE and receive a response signal SRX generated at the common voltage electrode CE by the touch driving signal STX. Further, the touch driving circuit 224 may sense an external object touching or approaching the panel 110, using the response signal SRX.

The touch driving circuit 224 may supply a touch driving circuit to a plurality of touch electrodes, for example, the common voltage electrodes CE.

Figure 3:
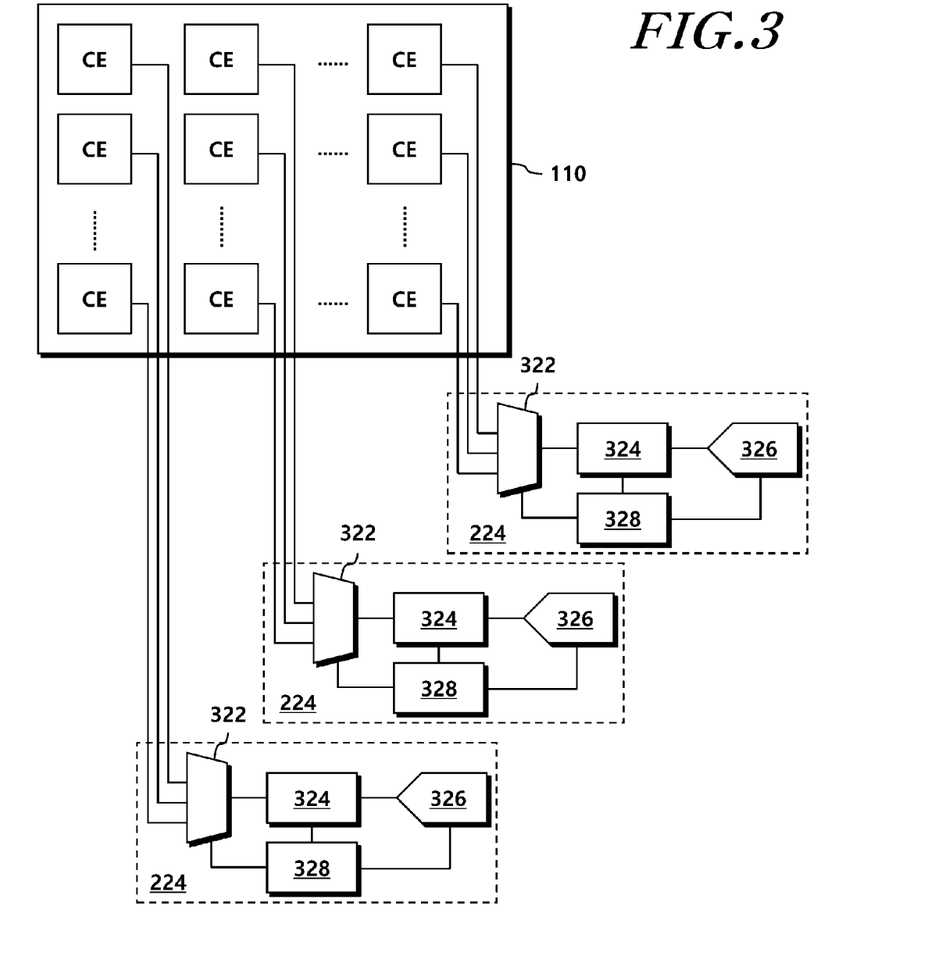
FIG. 3 is a diagram showing that touch driving circuits according to an embodiment each supply touch driving signals to a plurality of touch electrodes.

FIG. 3 is a diagram showing that touch driving circuits according to an embodiment each supply touch driving signals to a plurality of touch electrodes.

Referring to FIG. 3, the touch driving circuit 224 may include a MUX 322, a signal processor 324, an analog-digital converter 326, and a touch driver 328.

The touch driving circuit 224 may supply touch driving signals to a plurality of touch electrodes, for example, the common voltage electrodes CE. However, components that may process response signals received from the touch electrodes, for example, the signal processors 324 and the analog-digital converters 326 are less than the touch electrodes, the touch driving circuits 224 may sequentially supply touch driving signals to the touch electrodes, using the MUX 322.

The touch driving circuits 224 each may select at least one touch electrode through the MUX 322. The touch driver 328 may supply a touch driving signal to the selected touch electrode. The signal processor 324 may process a response signal generated at the touch electrode in response to the touch driving signal. The analog-digital converter 326 may convert the processed analog signal into a digital signal. When it is finished to supply a touch driving signal and process a response signal for one touch electrode, the touch driving circuit 224 may select a next touch electrode through the MUX 322 and may repeat the same process.

The touch driving circuit 224 may count touch driving signals, using the MUX 322, and determine whether there is a fault by comparing the count value of the touch driving signals with a set value. For example, the touch driving circuit 224 may count touch driving signals that it supplied through the MUX 322.

The touch driving circuit 224 may determine whether there is a fault by comparing the count value with the set value, as described above, in which, for example, the set value may be the same as the number of the touch electrodes connected to the MUX 322.

Figure 4:
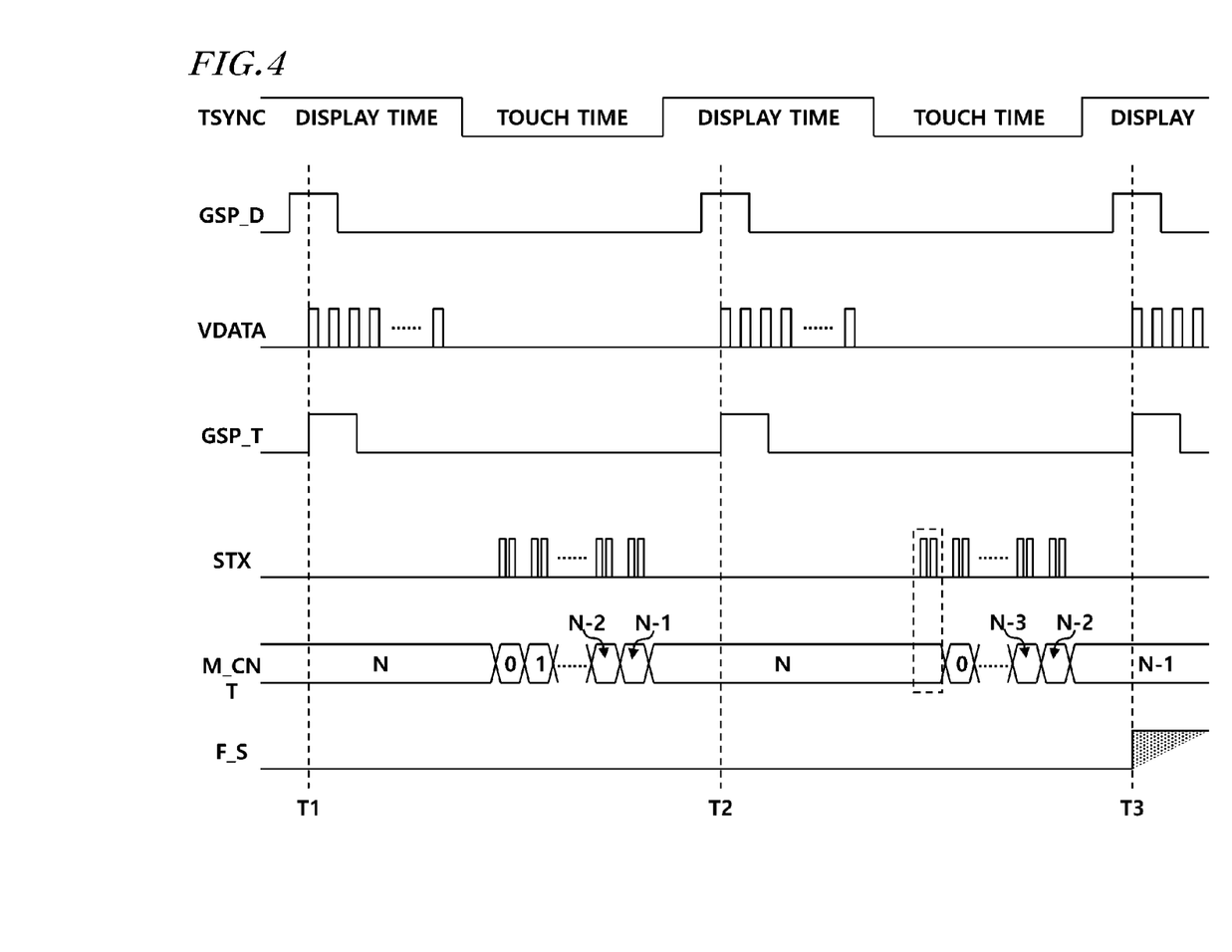
FIG. 4 is a timing diagram of signals in the panel driving apparatus according to an embodiment.

FIG. 4 is a timing diagram of signals in the panel driving apparatus according to an embodiment.

Referring to FIG. 4, the panel driving apparatus may discriminate a display time and a touch driving time from each other, and may supply data voltages VDATA to pixels in the display time and touch driving signals STX to touch electrodes in the touch driving time.

The display time and the touch driving time may be repeated in the unit of a frame that is the basic unit for displaying an image.

The data driving circuit of the panel driving apparatus may receive frame signals GSP_D from the timing control apparatus and discriminate frame times on the basis of the frame signals GSP_D. A gate, that is, start point indicating the point of supplying a scan signal may be included in the frame signals GSP_D and the data driving circuit may discriminate the frame times by recognizing the gate, that is, start points.

The data driving circuit may transmit the frame signals GSP_D to the touch driving circuit. Alternatively, the data driving circuit may transmit auxiliary frame signals GSP_T generated in correspondence to the frame signals GSP_D to the touch driving circuit.

The touch driving circuit may determine whether there is a fault in the touch driving circuit at a point in each of the frame times indicated by the frame signals GSP_D or the auxiliary frame signals GSP_T. According to this mechanism, the touch driving circuit may periodically determine whether there is a fault in each of the frame times. The touch driving circuit may determine whether there is a fault in the touch driving circuit at frame start points indicated by the frame signals GSP_D or the auxiliary frame signals GSP_T. The frame signals GSP_D or the auxiliary frame signals GSP_T may have at least one rising-edge or falling-edge and the touch driving circuit may determine whether there is a fault in the touch driving circuit at the rising-edges or the falling-edges.

The touch driving circuit supplies touch driving signals STX to the touch electrodes in the touch driving times. The touch driving circuit may determine whether there is a fault by counting touch driving signals STX that it supplied in one frame time and comparing the count value of the touch driving signals STX with a set value, which is stored in advance, at respective points T1, T2, and T3 of the frame times identified on the basis of the frame signals GSP_D.

The touch driving circuit may store the count value M_CNT of touch driving signals STX in a predetermined storage. Further, the touch driving circuit may reset the count value M_CNT stored in the storage when a touch driving signal STX starts to be supplied in the frame times.

The touch driving circuit may check touch driving signals STX supplied through a MUX and increase the count value M_CNT stored in the storage. Further, the touch driving circuit may compare the count value M_CNT with the set value, which is stored in advance, at the respective points T1, T2, and T3 of the frame times identified on the basis of frame signals GSP_D. When there is a difference between the count value M_CNT and the set value, it is possible to determine that there is a fault in the touch driving circuit. When temporal noise enters in the touch driving circuit or there is a temporal tangle in internal logic, touch driving signals STX may be missed in counting.

In the example shown in FIG. 4, the count value M_CNT at a first point T1 is N (N is a natural value of 2 or more) and it may be the same as the set value. The count value M_CNT at a second point T2 is also N and it is the same as the set value, so the touch driving circuit may determine that there is no fault. However, after the second point T2, one touch driving signal STX is missed in counting and the count value M_CNT at a third point T3 is N−1. Accordingly, the touch driving circuit may determine that there is a fault in the touch driving circuit by checking the difference between the count value M_CNT and the set value. Further, when determining that there is a fault, the touch driving circuit may output a fault signal F_S to the outside.

Figure 5:
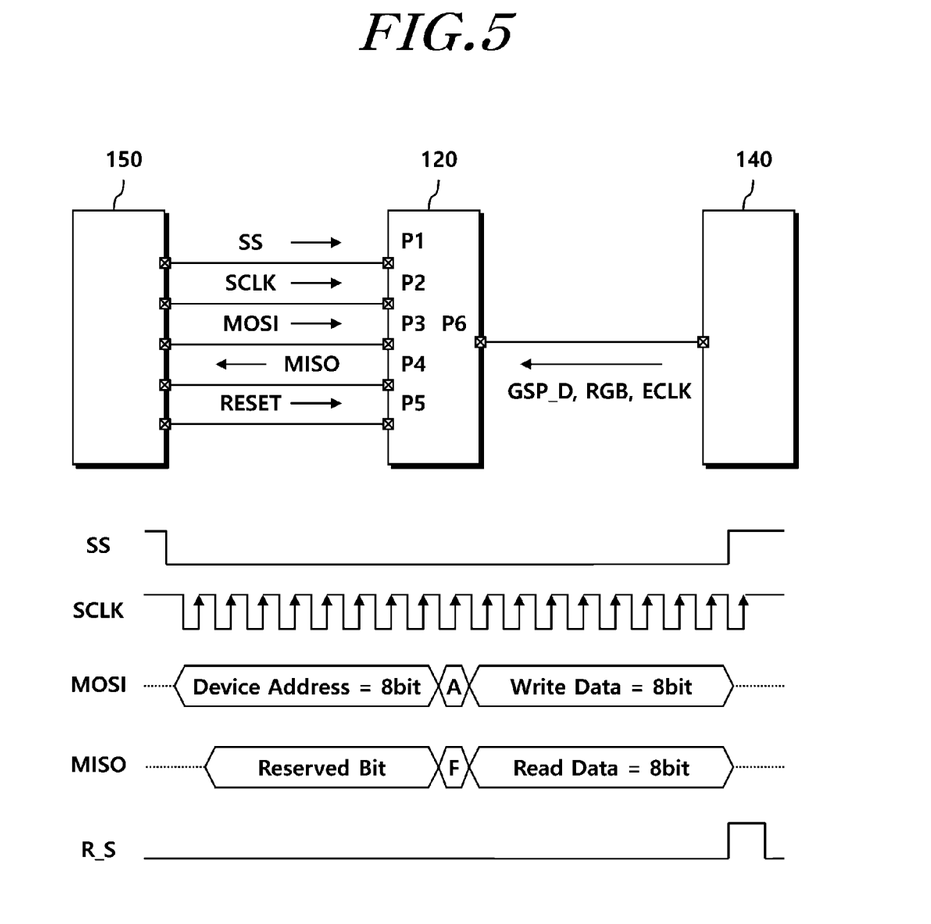
FIG. 5 is a diagram showing signals that are input to and output from the panel driving apparatus according to an embodiment.

FIG. 5 is a diagram showing signals that are input to and output from the panel driving apparatus according to an embodiment.

Referring to FIG. 5, the panel driving apparatus 120 may include at least six input and output pins P1~P6 and may transmit and receive signals to and from the timing control apparatus 140 and the touch data processing apparatus 150.

The panel driving apparatus 120 may receive a frame signal GSP_D from the timing control apparatus 140 through a sixth pin P6. Frame signals GSP_D are used by the data driving circuit in the panel driving apparatus 120 and the data driving circuit may discriminate frame times on the basis of the frame signals GSP_D and supply data voltages corresponding to image data RGB to the pixels in the frame times.

The data driving circuit also receives image data RGB and a first clock signal ECLK from the timing control apparatus 140, and the first clock signal ECLK, image data RGB, and frame signal GSP_D may be all transmitted through the same signal line. The signal that is transmitted from the timing control apparatus 140 to the data driving circuit may be an embedded clock signal. Since the distance between the timing control apparatus 140 and the panel driving apparatus 120 is relatively long, an embedded clock signal may be transmitted and received between the timing control apparatus 140 and the panel driving apparatus 150 to prevent a time delay error due to wires and reduce the number of wires.

On the other hand, since the distance between the panel driving apparatus 120 and the touch data processing apparatus 150 is relatively short, the panel driving apparatus 120 may transmit and receive a signal, using a specific clock signal. For example, the panel driving apparatus 120 and the touch data processing apparatus 150 may transmit and receive signals through Serial Peripheral Interface (SPI) communication.

The touch data processing apparatus 150 may transmit and receive a slave select (SS) signal of SPI communication through the first pine P1 of the panel driving apparatus 120.

When the SS signal shows a low level, data is transmitted and received through SPI communication, and the touch data processing apparatus 150 may transmit a master out slave in (MOSI) signal through the third pin P3 of the panel driving apparatus 120 when the SS signal is at a low level. Further, when the SS signal is at a low level, the touch data processing apparatus 150 may receive a master in slave out (MISO) signal through the fourth pin P4 of the panel driving apparatus 120. The MOSI signal and the MISO signal may be synchronized with a second clock signal SCLK that is supplied to the second pin P2 of the panel driving apparatus 120.

The panel driving apparatus 120 may transmit a fault signal through the MISO signal. The panel driving apparatus 120 may transmit a downstream that includes a flag F indicating a fault signal and is transmitted through MISO. The flag F may be composed of one bit, and when the flag F is high or low, it may mean that there is a fault in the touch driving circuit of the panel driving apparatus 120.

The touch data processing apparatus 150 may transmit an 8 bit signal showing the address of a slave device through a MOSI signal, may transmit a differentiation bit A, and then may transmit 8 bit data. In correspondence to this process, the panel driving apparatus 120 may transmit an 8 bit reserved bit and a flag F for a fault signal and then transmit 8 bit data to the touch data processing apparatus 150. Touch data may be included in the 8 bit data that is transmitted to the touch data processing apparatus 150. The flag F for a fault signal may have the same timing as the differentiation bit A of the MOSI signal. The differentiation bit A may be a bit indicating reading/writing (R/W).

The panel driving apparatus 120 may include a reset pin P5. The panel driving apparatus 120 may reset the internal circuit in response to a signal received through the reset pin P5. In particular, the panel driving apparatus 120 may reset the touch driving circuit in response to a signal received through the reset pin P5.

The touch data processing apparatus 150 may output a reset signal R_S to the reset pin P5. The touch data processing apparatus 150 may output a reset signal R_S in a time in which an SS signal of SPI communication is at a high level. In a time in which the SS signal is at a low level, a MOSI signal and a MISO signal are supplied, so the part that processes MOSI signals and MISO signals may be operated and data in the part that is in operation by a reset signal R_S may be lost in the panel driving apparatus 120. Accordingly, the touch data processing apparatus 150 may output a reset signal R_S in the time in which the SS signal is at a high level.

The touch data processing apparatus 150 may receive a fault signal from the panel driving apparatus 120, externally output a reset signal R_S to the panel driving apparatus 120, and internally reset the part storing touch data of the panel driving apparatus 120.

Figure 6:
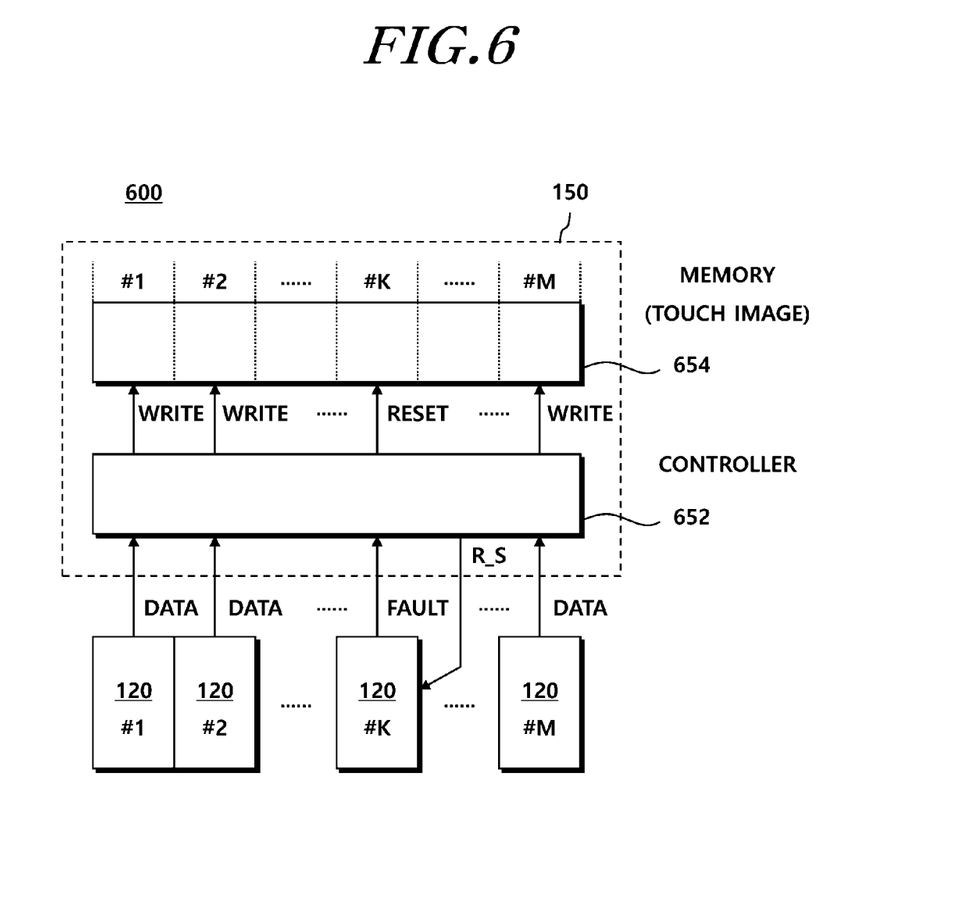
FIG. 6 is a diagram showing that the touch data processing apparatus according to an embodiment processes touch data of the panel driving apparatus.

FIG. 6 is a diagram showing that the touch data processing apparatus according to an embodiment processes touch data of the panel driving apparatus.

Referring to FIG. 6, a panel driving system 600 that drives a display device may include a plurality of panel driving apparatuses 120 and a touch data processing apparatus 150, in which the panel driving apparatuses 120 may transmit touch data DATA to the touch data processing apparatus 150.

The panel driving apparatuses 120 may create touch data DATA for different locations (which may partially overlap) on a panel and transmit the touch data to the touch data processing apparatus 150. A controller 652 of the touch data processing apparatus 150 may process and store the touch data DATA transmitted from the panel driving apparatuses 120 in a memory 654. The memory 654 has separate memory spaces, which correspond to the panel driving apparatuses 120, respectively, for example, areas of variables, and the touch data DATA processed by the controller 652 may be stored respectively in the memory spaces respectively corresponding to the panel driving apparatuses 120.

The controller 652 may create touch coordinates by comparing the touch data DATA stored in the memory 654 with reference touch data.

Meanwhile, the controller 652 may receive a fault signal from a specific panel driving apparatus (120# K in FIG. 6), and in this case, the controller 652 may reset touch data, that is, a memory space (654# K in FIG. 6) corresponding to the specific panel driving apparatus (120# K in FIG. 6). The resetting may mean, for example, changing the data in a corresponding memory space (654# K in FIG. 6) into reference touch data.

The controller 652 may reset the touch data, that is, the memory space (654# K in FIG. 6) corresponding to the specific panel driving apparatus (120# K in FIG. 6) and then transmit a reset signal R_S to the specific panel driving apparatus (120# K in FIG. 6). The specific panel driving apparatus (120# K in FIG. 6) resets a touch driving circuit and creates and transmits new touch data to the touch data processing apparatus 150 in response to the reset signal R_S, whereby it may automatically remove a fault.

According to the embodiments described above, it is possible to easily find out a fault in a panel driving apparatus. Further, according to the embodiments, it is possible to reset a panel driving apparatus with a fault and automatically recover the panel driving apparatus from the fault.

In addition, since terms, such as "including," "comprising," and "having" mean that one or more corresponding components may exist unless they are specifically described to the contrary, it shall be construed that one or more other components may be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A panel driving apparatus comprising:
   a data driving circuit configured to discriminate frame times on the basis of received frame signals and supply data voltages corresponding to image data to pixels; and
   a touch driving circuit configured to count touch driving signals supplied to a plurality of touch electrodes, to determine that there is a fault when there is a difference between a set value and a count value of the touch driving signals at a point in each of the frame times identified by the frame signals, and to output a fault signal.

2. The apparatus of claim 1, wherein the touch driving circuit sequentially supplies the touch driving signals to the plurality of touch electrodes through a multiplexor (MUX) and counts the touch driving signals supplied through the MUX.

3. The apparatus of claim 2, wherein the set value is the same as the number of the plurality of touch electrodes connected to the MUX.

4. The apparatus of claim 1, wherein the data driving circuit supplies the data voltages to the pixels in a display time, and
   the touch driving circuit supplies common voltages to the plurality of touch electrodes in the display time and supplies the touch driving signals to the plurality of touch electrodes in a touch driving time.

5. The apparatus of claim 1, wherein the data driving circuit receives the frame signals and transmits the frame signals or auxiliary frame signals generated in correspondence to the frame signals to the touch driving circuit, and
   the touch driving circuit compares the count value of the touch driving signals with the set value at frame start points indicated by the frame signals or the auxiliary frame signals.

6. The apparatus of claim 1, wherein the touch driving circuit stores the count value in a storage and resets the count value stored in the storage when starting to supply the touch driving signals in the frame times.

7. A panel driving system comprising:
   a plurality of panel driving integrated circuits configured to discriminate frame times on the basis of received frame signals, supply data voltages corresponding to image data to pixels, determine whether there is a fault in a touch driving circuit at a point in each of the frame times, and output a fault signal when determining that there is a fault in the touch driving circuit; and a touch data processing apparatus configured to output a reset signal to a panel driving integrated circuit that outputs the fault signal.

8. The system of claim 7, wherein the touch data processing apparatus comprises a memory configured to store touch data received from the plurality of panel driving integrated circuits, and resets touch data corresponding to the panel driving integrated circuit that outputs the fault signal, in the memory.

9. The system of claim 7, wherein the panel driving integrated circuit transmits a data stream that includes a flag indicating the fault signal and is transmitted to the touch data processing apparatus.

10. The system of claim 7, wherein the plurality of panel driving integrated circuits reset an internal circuit in response to a signal received through a reset pin, and the touch data processing apparatus outputs the reset signal to the reset pin.

11. The system of claim 7, wherein the panel driving integrated circuit receives the frame signals through a first signal embedded with a clock and outputs the fault signal through a second signal separated from a clock.

12. The system of claim 7, wherein the plurality of panel driving integrated circuits sequentially supply touch driving signals to a plurality of touch electrodes and determine that there is a fault in the touch driving circuit when there is a difference between a count value of the touch driving signals and a set value.

13. The system of claim 12, wherein the plurality of panel driving integrated circuits sequentially supply the touch driving signals to the plurality of touch electrodes through a MUX and count the touch driving signals supplied through a multiplexor (MUX).

14. The system of claim 12, wherein the plurality of panel driving integrated circuits receive the frame signals and compare the count value of the touch driving signals with the set value at frame start points indicated by the frame signals or auxiliary frame signals generated in correspondence to the frame signals.

15. The system of claim 7, wherein the plurality of panel driving integrated circuits supply the data voltages to the pixels and common voltages to the plurality of touch electrodes in a display time, and supply the touch driving signals to the plurality of touch electrodes in a touch driving time.

16. The system of claim 7, wherein the panel driving integrated circuit transmits the fault signal through a master in slave out (MISO) signal of serial peripheral interface (SPI) communication, and the touch data processing apparatus outputs the reset signal in a time in which a slave select (SS) signal of the SPI communication is at a high level.

17. The system of claim 16, wherein the panel driving integrated circuit transmits a data stream that includes a flag indicating the fault signal and is transmitted through the MISO, and determines that there is a fault in the touch driving circuit when the flag is high or low.

* * * * *